United States Patent [19]

Rogiers

[11] Patent Number: 5,629,366
[45] Date of Patent: May 13, 1997

[54] GLUCOSIDE AND ACRYLIC COPOLYMER DISPERSANT COMPOSITION

[75] Inventor: Lodewijk M. Rogiers, Haacht, Belgium

[73] Assignee: Imperial Chemical Industries PLC, United Kingdom

[21] Appl. No.: 200,380

[22] Filed: Feb. 23, 1994

Related U.S. Application Data

[63] Continuation of Ser. No. 781,636, Oct. 18, 1991, abandoned, which is a continuation of Ser. No. 449,031, Dec. 11, 1989, abandoned.

[30] Foreign Application Priority Data

Dec. 22, 1988 [GB] United Kingdom ............. 8829925

[51] Int. Cl.$^6$ .................... C08K 5/06; C08K 5/15
[52] U.S. Cl. ................ 524/56; 524/127; 524/58; 524/556; 524/558; 106/217.7
[58] Field of Search ................. 524/56, 58, 556, 524/558, 27; 106/162, 216

[56] References Cited

U.S. PATENT DOCUMENTS

| 4,077,926 | 3/1978 | Sanderson et al. | 524/558 |
|---|---|---|---|
| 4,429,097 | 1/1984 | Chang et al. | 524/558 |
| 4,657,999 | 4/1987 | Hoefer et al. | 526/200 |
| 4,678,595 | 7/1987 | Malik et al. | 252/174.17 |
| 4,680,324 | 7/1987 | Malwitz | 524/58 |
| 4,690,818 | 9/1987 | Puchalski, Jr. et al. | 424/70 |
| 4,769,167 | 9/1988 | Haas et al. | 524/558 |
| 5,449,475 | 9/1995 | Cauwet et al. | 282/174.23 |

FOREIGN PATENT DOCUMENTS

20515/88  9/1989  Australia .

*Primary Examiner*—Romulo H. Delmendo

[57] ABSTRACT

A composition of a glycoside and an acrylic copolymer. The blend may be used to prepare aqueous dispersions of a ceramic materials, for example zirconium silicate. Alternatively, aqueous dispersions of fluorine containing polymers, for example polvinylidene fluoride, may be prepared using the blend. The proportion of glycoside to acrylic copolymer may be 10:1 to 1:10, for example 1:1, by weight.

19 Claims, No Drawings

GLUCOSIDE AND ACRYLIC COPOLYMER DISPERSANT COMPOSITION

This is a continuation of application Ser. No. 07/781,636 filed on Oct. 18, 1991, abandoned, which is a continuation of application Ser. No. 07/449,031 filed on Dec. 11, 1989, abandoned.

The present invention relates to compositions and, in particular, to compositions which can be used to prepare dispersions of solids in an aqueous medium.

For many applications it is desirable to form dispersions of solids in an aqueous medium. The dispersions thus formed may be used to form coatings of the solid onto a surface. A number of solids are difficult to disperse or, if dispersed, give a dispersion which gives an unsatisfactory coating of the solid onto a surface. It is known to use surface active materials to assist in the formation of the dispersion but even when using surface active materials some solids are difficult to disperse or, if dispersed, give an unsatisfactory coating. This is undesirable, especially when coating a wax former to produce a ceramic mould for the formation of complex metal castings which are suitable for use in the automobile and aerospace industry. Accordingly there remains a need to provide improved materials for the formation of dispersions. We have now found that improved dispersing properties can be obtained using a mixture of materials and, in particular, a mixture of specific materials can provide an especially useful effect.

According to the present invention there is provided a composition comprising (A) a glycoside; and (B) an acrylic copolymer.

The weight ratio of A to B is typically in the range from 20:1 to 1:20, end more particularly is in the range from 5:1 to 1:5, for example 1:1.

Component (A) of the composition is a glycoside and may be a monoglycoside, a polyglycoside or a mixture thereof. The glycoside is typically a compound which can be represented by the general formula:

$R(OG)_a$ where:

R is a hydrophobic moiety:

G is a saccharide group; and a has a value of at least one.

The group R can be a hydrocarbyl group, a substituted hydrocarbyl group, a hydrocarbonoxy group or a substituted hydrocarbonoxy group. More specifically, the group R can be an alkyl, cycloalkyl, aryl, alkaryl, aralkyl, alkenyl, alkoxy or aryloxy group and is preferably an alkyl or alkoxy group. The group R conveniently contains from 4 to 30 carbon atoms, preferably up to 24 carbon atoms, more preferably from 6 to 18 carbon atoms and especially from 8 to 14 carbon atoms. The group R can be a mixture of different groups, for example a mixture of alkyl or alkoxy groups containing different numbers of carbon atoms. Thus, R can be a mixture of alkyl or alkoxy groups which contain, on average, 8 to 14 carbon atoms, for example a mixture of alkyl or alkoxy groups containing, on average, from 9 up to 10 carbon atoms.

The saccharide group G may be derived from fructose, glucose, mannose, galactose, telose, gulose, allose, altrose, idose, arabinose, xylose, lyxose and ribose or from mixtures thereof. The group G is conveniently derived from glucose units and the glycoside is then a glucoside.

The value of a is the degree of polymerisation. When a one, the glycoside is a monoglycoside. Typically the value of a is greater than one and the glycoside is a polyglycoside, a mixture of polyglycosides, a mixture of a monoglycoside and a polyglycoside, or a mixture of a monoglycoside with a mixture of polyglycosides. The value of a is typically at least 1.1, particularly at least and especially at least 1.3. The value of a is typically not greater than 8, particularly not greater than 4 and especially not greater than 2.

When the glycoside is an alkyl glucoside, the value of a is conveniently between 1 and 2. We have obtained useful results when the glycoside is an alkyl glucoside of the general formula:

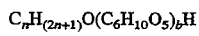

$C_nH_{(2n+1)}O(C_6H_{10}O_5)_bH$ where:

n has a value of 8 to 14, and b has a value of greater than one and not more than two.

The glycoside may be one in which the average value of n is from 9 to 13 and particularly is about 10. The value of b is typically at least 1.3 and not more than 1.9. A particularly useful material of this type is one in which n is from 8 to 11 and has an average value of 10 and b is about 1.35.

Hydrocarbyl glycosides are commercially available materials for example as APG 225 Glycoside, APG 300 Glycoside or as Triton BG 10.

The acrylic copolymer which is component (B) of the mixture is a copolymer having some surface active characteristics. Thus, the copolymer is either an acrylic copolymer having water soluble side chains or is a product containing acid groups which are capable of salt formation in the presence of one or more bases. The copolymer may contain both water soluble side chains and acid groups. Whilst satisfactory results can be obtained with a copolymer which contains water soluble side chains, we have found that an improvement is obtained if such a copolymer also contains some acid groups.

If the copolymer contains water soluble side chains, these very conveniently include oxyethylene units and preferably are polyoxyethylene chains. Such chains may be terminated with a hydroxy group but it is generally preferred that the chain is terminated with an alkoxy group, particularly a methoxy group. The copolymer is preferably a copolymer of an acrylic ester with an acrylic acid, which my have been reacted, for example pre-reacted with a polyoxyethylene glycol or derivative. Hence, a copolymer of this type contains ester groups together with groups which are derived from the reaction of an acid with the polyoxyethylene glycol. (For convenience hereafter the term "ester" will be used to mean the grouping obtained by the reaction of an alcohol, other than a polyoxyethylene glycol, or phenol with a carboxylic acid.) The copolymer preferably also includes some acid groups.

The acrylic copolymer may be obtained from acrylic monomers or derivatives of acrylic monomers such as mathacrylic monomers, or may be derived from mixtures thereof. Copolymers based on mathacrylic monomers are preferred, such monomers including mathacrylic acid and esters thereof such as the methyl and butyl esters.

Copolymers containing water soluble side chains typically contain at least 50% by weight of units containing the water soluble side chains and not more than 5% by weight of units containing acid groups, the remainder being units containing ester groups. The copolymers typically contain not more than 80% by weight of units containing the water soluble side chains and not less than 20% by weight of units containing ester groups.

The acrylic copolymer may, alternatively, be one in which there are no water soluble side chains. Such a copolymer is a copolymer of an acrylic acid monomer with at least one acrylic ester monomer (the terms "acrylic acid monomer" and "acrylic ester monomer" are used herein to include derivatives thereof such as methacrylic acid and esters thereof). Copolymers of this type preferably contain at least 2% by weight of the acid monomer but in general the acid content does not exceed 10% by weight. The remainder of the copolymer is formed of ester groups and may be all the same ester units or a mixture of ester units such as a mixture of methyl and butyl esters. A copolymer of this type is generally essentially insoluble in an aqueous medium, including aqueous base solutions, but is soluble in organic solvents, particularly non-polar organic solvents, for example aromatic solvents such as benzene, toluene, xylene and the like.

It is generally preferred that the acrylic copolymer is one containing water soluble side chains in a sufficient quantity to render the whole polymer water soluble.

The acrylic copolymer which is component (B) of the mixture is typically a polymer containing the units

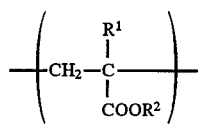

where $R^1$ is hydrogen or a hydrocarbyl group;

$R^2$ is hydrogen, a hydrocarbyl group or a group $(AO)_xR^3$ $R^3$ is hydrogen or a hydrocarbyl group;

A is an alkylene group;

x is at least one; and at least some of the groups $R^2$ are hydrogen or $(AO)_xR^3$.

If the groups $R^1$, $R^2$ or $R^3$ are hydrocarbyl groups they are preferably alkyl groups which contain not more than 24 carbon atoms and particularly are lower alkyl groups containing 1 to 6 carbon atoms, for example a methyl or butyl group.

If $R^2$ is a group $(AO)_xR^3$, the group A may be ethylene propylene or butylene and is preferably ethylene. The value of x is typically at least 10 and generally does not exceed 40.

The acrylic copolymer typically consists of the units

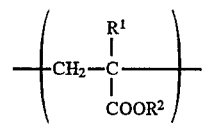

in which the groups $R^1$ and $R^2$ can vary. Typically $R^1$ is hydrogen or methyl or in some units is hydrogen and in other units is methyl. The group $R^2$ may be hydrogen, a hydrocarbyl group such as methyl or butyl or a hydrocarbyloxy polyoxyethylene group and is typically a combination of at least two such groups. Preferred acrylic copolymers are those in which $R^1$ is methyl and $R^2$ is a combination of hydrogen, a methyl or butyl group and a methoxypolyoxyethylene group.

The number average molecular weight of the acrylic copolymer is typically at least 1000. The molecular weight of the acrylic copolymer is preferably not so high that a solution thereof has a high viscosity and does not flow readily, for example the solution does not pour easily. Hence, it is preferred that the number average molecular weight does not exceed 10000. In general, the number average molecular weight is at least 2000 and is not more than 6000.

The glycoside which is component (A) of the composition typically contains several alcoholic —OH groups and the acrylic copolymer which is component (B) preferably contains some acid groups. On mixing such materials the possibility of reaction is slight provided the mixture is maintained at ambient temperature or a temperature which is only a little above ambient temperature, for example not more than 50° C. It is preferred to avoid any reaction until the composition is used and hence the mixture should be stored at a temperature at which no appreciable reaction occurs.

We have found that compositions in accordance with the present invention can be used to form suspensions or slurries of solids in liquids, more specifically in an aqueous medium. Using the compositions of the present invention it is possible to form suspensions or slurries having improved properties.

The solid may be a ceramic material and using the compositions of the present invention it is possible to prepare slurries containing at least 50% and in many instances up to 80%, or more, by weight of solid, the remainder being water. Even at such high levels of solid, the slurry obtained has satisfactory flow properties and can be coated onto a substrate to give a smooth coating which sticks well to the substrate. In contrast, using other mixtures or using the glycoside alone, a smooth surface coating is not obtained and the coating may not adhere satisfactorily to the substrate. Such slurries of ceramic material, for example a zirconium silicate slurry, can be used to prepare moulds for metal casting by coating the slurry onto a wax former.

We have found that the effectiveness of the composition of the present invention is dependent on the particular solid being dispersed and that different compositions show different effects depending on the particular solid.

The compositions of the present invention can be used to prepare aqueous suspensions of organic solids, for example polymeric materials especially those which do not readily form a satisfactory, stable, suspension such as a fluorine-containing polymer. We have obtained aqueous suspensions containing at least 20 % by weight of a polymer material, particularly at least 40%, for example 50%, by weight of polyvinylidene fluoride using a composition in accordance with the present invention. In contrast to suspensions containing only one of the components or containing a different mixture of. components, the suspensions obtained using the composition of the present invention give no caking or bleeding on being stored for a day and have a low viscosity. If a suitable thickener is added, for example a polysaccharide or a cellulose derivative, the suspension shows no caking and little or no bleeding on being stored for a week.

The amount of the composition used to obtain a suspension is dependent on the components of the suspension. Thus, satisfactory suspensions can be obtained using the composition in an amount of from at least 0.1 up to 10% by weight of the total weight of the suspension. In general the amount of the composition in the suspension is at least 0.25% by weight. The amount of the composition in the suspension generally does not exceed 7.5% by weight.

Various aspects of the present invention are described in more detail hereafter in the following, non-limiting examples in which all proportions are by weight unless stated to the contrary.

EXAMPLES 1 AND 2

Slurries based on zirconium silicate were prepared using one or more additives.

A surfactant, or a mixture of surfactants, was mixed with a slurry of silica in water containing 30% by weight of silica. In the preparations of Example 1, 2 and Comparative Example E n-hexanol was then added to the mixture whilst continuing to stir. Zirconium silicate and cobalt aluminate were then added to the mixture whilst continuing to stir at 500 r.p.m. The mixture was then subjected to vigorous stirring and shearing for one minute using an Ultra-Turrax mixer operating at 2000 r.p.m. The viscosity of the slurry obtained was then determined.

Each slurry was coated onto a wax and a glass plate by dipping the plate in the slurry and allowing the coated plate to dry for at least 30 minutes at ambient temperature. The appearance of the coating was assessed visually.

The compositions formed, and the results obtained, are set out in Table One.

TABLE One

| Ex. or Comp. | Composition - Wt. % (a) | | | | | | | | | | Visc (mPa · s) | Coat |
|---|---|---|---|---|---|---|---|---|---|---|---|---|
| Ex. | Z-1 | S-W | CA | G1 | G2 | G3 | M | P1 | POE | NH | (b) | (c) |
| A | 72 | 20 | 8 | 0.2 | — | — | — | — | — | — | 4680 | RT |
| B | 72 | 20 | 8 | — | 0.2 | — | — | — | — | — | 21530 | RT |
| C | 72 | 20 | 8 | — | — | 0.2 | — | — | — | — | 6240 | R |
| D | 72 | 20 | 8 | — | — | — | 0.2 | — | — | — | ND | R |
| 1 | 72 | 20 | 8 | 0.2 | — | — | — | 0.2 | — | 0.3 | 1880 | VSG |
| 2 | 72 | 20 | 8 | — | 0.2 | — | — | 0.2 | — | 0.3 | 4060 | VSG |
| E | 72 | 20 | 8 | — | — | — | — | 1.0 | 0.2 | 0.3 | ND | RB |

Notes to Table One
(a) Z-1 is milled zirconium silicate, obtained from Remet, France.
S-W is a 30% by weight slurry of silica in water.
CA is a cobalt aluminate.
G1 is a 50% w/w aqueous solution of an alkyl glucoside having a mixture of alkyl groups of chain length 8 to 11 carbon atoms, an average chain length of 10 carbon atoms, and with an average degree of polymerisation of 1.35.
G2 is a 70% w/w aqueous solution of an alkyl glucoside having a mixture of alkyl groups of chain length 8 to 10 carbon atoms, an average chain length of 9 carbon atoms, and with an average degree of polymerisation of 1.5.
G3 is a 50% w/w aqueous solution of an alkyl glucoside having a mixture of alkyl groups of chain length 8 to 11 carbon atoms, an average chain length of 10 carbon atoms, and with an average degree of polymerisation of 1.8.
M is a mixture of ethoxylated (45), propoxylated (38) butyl carbitol (62.5% by weight), ethoxylated (10) nonylphenol (25% by weight) and water (12.5% by weight).
P1 is a copolymer of methyl methacrylate, methacrylic acid and the product of reacting methacrylic acid with methoxypolyoxyethylene (16–18) glycol in proportions by weight of 37:2:61 and having a number average molecular weight of about 4500.
POE is ethoxylated (8) nonylphenol.
NH is n-hexanol.
(b) Viscosity in milli Pascal-seconds measured at 22° C. using a Brookfield LVT viscometer using spindle D at 6 r.p.m., the viscosity being recorded after one minute.
(c) RT is a rough and thick surface coating.
R is a rough coating.
VSG is a very smooth coating with good sticking to the substrate.
RB is a rough coat with poor sticking to the substrate.
ND means not determined.

EXAMPLES 3 TO 6

The procedure of Examples 1 and 2 was repeated using a different type of zirconium silicate and different additive combination. The results are set out in Table Two, from which it can be seen that the effectiveness of the additives is dependent on the nature of the material being dispersed.

The dispersions were coated onto both wax and glass substrates.

TABLE Two

| Ex. or Comp. Ex. | Composition - Wt. % (a) (d) | | | | | | | | | | Visc (mPa · s) (b) | Coat (c) (e) |
|---|---|---|---|---|---|---|---|---|---|---|---|---|
| | Z-2 | S-W | CA | NH | P1 | P2 | G1 | G2 | G4 | M | | |
| F | 72 | 20 | 8 | 0.3 | 0.2 | — | — | — | — | — | 1400 | R |
| G | 72 | 20 | 8 | 0.3 | 1.0 | — | — | — | — | — | 1470 | FR |
| 3 | 72 | 20 | 8 | 0.3 | — | 0.2 | 0.2 | — | — | — | 1300 | VS |
| 4 | 72 | 20 | 8 | 0.3 | 0.2 | — | 0.2 | — | — | — | 2340 | R |
| 5 | 72 | 20 | 8 | 0.3 | 0.2 | — | — | — | 0.2 | — | 4530 | FR/S |
| 6 | 72 | 20 | 8 | 0.3 | 0.2 | — | — | 0.2 | — | — | 17320 | R |
| H | 72 | 20 | 8 | 0.3 | 0.2 | — | — | — | — | 0.2 | 2340 | R |
| I | 72 | 20 | 8 | 0.3 | 1.0 | — | — | — | — | 0.2 | 2800 | R |

Notes to Table Two
(a), (b) and (c) are as defined in Notes to Table One.
(d) Z-2 is zirconium silicate, obtained from Keyser and Mackay, France as Zircosil 200M.
P2 is a copolymer of methyl methacrylate, butyl methylacrylate and methacrylic acid in proportions by weight of 42:54:4 and having a number average molecular weight in the range 2500 to 3000.
G4 is a 50% w/w aqueous solution of an alkyl glucoside having a mixture of alkyl groups of chain length 12 to 14 carbon atoms, an average chain length of 12.5 carbon atoms and with an average degree of polymerisation of 1.35.
(e) reference indicates the type of coating on both (wax or glass) substrates.
FR is a rough coating with fish eyes.
VS is a very smooth coating.
FR/S is rough coating with fish eyes on a wax substrate and a smooth coating on a glass substrate.

EXAMPLES 7 to 9

The surface tension of a number of aqueous solutions was measured using a torsion balance (White Electrical Instruments Co.Ltd.) at ambient temperature. The solutions were prepared using distilled water. The results are set out in Table Three.

A surfactant, or a mixture of surfactants, was mixed with distilled water. Polyvinylidene fluoride was added as a powder whilst stirring at 300 r.p.m. The mixture was then homogenised for three minutes using an Ultra-Turrax mixer operating at 2000 r.p.m.

TABLE Three

| Ex or Comp. Ex (f) | Additive | | Surface Tension (mN/m) Additive Concentration (wt. %) (i) | | | | | | |
|---|---|---|---|---|---|---|---|---|---|
| | Type (a) | % (h) | 0.01 | 0.05 | 0.1 | 0.2 | 0.4 | 0.6 | 1.0 |
| J | G1 | 100 | 41 | 35 | 31.5 | 31.5 | 31.5 | 31.5 | ND |
| 7 | G1/P1 | 70/30 | 49 | 42 | 32.5 | 31.5 | 31.5 | ND | 31.5 |
| 8 | G1/P1 | 50/50 | 52 | 39.5 | 35 | 31.5 | 31 | 31.5 | 31.5 |
| 9 | G1/P1 | 30/70 | 52 | 44 | 40 | 34.5 | 31.5 | 31.5 | 32.5 |
| K | P1 | 100 | 50.5 | 51 | 51 | 51 | ND | 46.5 | 46.5 |
| L | ESL | 100 | 46.5 | 41.5 | 40.5 | 40.5 | 41 | 40.5 | 41 |
| M | ESL/P1 | 70/30 | ND | 44.5 | 43 | 42.5 | 41 | 41 | 40 |
| N | ESL/P1 | 50/50 | 44 | 40.5 | 42 | 40.5 | 41 | 41 | 40.5 |
| O | ESL/P1 | 30/70 | 58 | 43 | 41 | 41 | 40.5 | 41 | 38.5 |

Notes to Table Three
(a) is as defined in Notes to Table One.
(f) ESL is ethoxylated (20) sorbitan monolaurate.
(h) The number represents the percentage, by weight, of each component of the additive.
(i) The concentration is of the total additive mixture as a wt. % of the total solution.

EXAMPLE 10

Aqueous dispersions of polyvinylidene fluoride were prepared as follows:

The slurry obtained was then allowed to stand at ambient temperature for 24 hours and the viscosity and stability of the slurry were then determined.

The compositions of the dispersions, and the properties thereof, are set out in Table Four.

TABLE Four

| Ex. or Comp. Ex | Composition (a) (j) | | | | | | | Stab (k) | Sep (l) | Visc (mPa·s) (m) |
|---|---|---|---|---|---|---|---|---|---|---|
| | F | P1 | FNS | G1 | ETA | M | W | | | |
| P  | 50 | 3 | —  | —  | —  | —  | 47 | C   | N   | ND    |
| 10 | 50 | 3 | —  | 3  | —  | —  | 44 | NC  | N   | 95    |
| Q  | 50 | 3 | —  | —  | 3  | —  | 44 | NC  | N   | 980   |
| R  | 50 | 3 | —  | —  | —  | 3  | 44 | C   | N   | 78    |
| S  | 50 | — | 3  | 3  | —  | —  | 44 | NC  | N/T | 14040 |

Notes to Table Four
(a) is as defined in Notes to Table One.
(j) F is polyvinylidene fluoride - Foraflon 1000 VLD, obtainable from Atochem, France.
FNS is a formaldehyde condensate of naphthalene sulphonate.
ETA is a mixture of tridecyl alcohol with an ethoxylated (4) alcohol (a mixture of octyl and decyl alcohol available as Alfol 8/10) in the weight ratio of 1:4.
W is water.
Quantities are parts by weight.
(k) Stab is determined by allowing the dispersion to stand at ambient temperature for 24 hours and is then determined by inserting a glass rod into the suspension to check the bottom of the container for any sedimentation.
C indicates that sedimentation has occurred.
NC indicates that no sedimentation has occurred.
(l) Sep is determined by allowing the dispersion to stand at ambient temperature for 24 hours.
N indicates that no distinct water layer is formed.
N/T indicates that no distinct water layer is formed and the dispersion is thixotropic.
(m) Viscosity in milli Pascal-seconds was measured after 24 hours at 22° C. using a Brookfield LVT viscometer using spindle B at 12 r.p.m., the viscosity being recorded after one minute.

EXAMPLES 11 to 15

The procedure described for Example 10 was repeated with the addition of thickeners to a dispersion having the composition of Example 10 with the exception that the water content was 43.5 parts by weight. The thickener was added to the mixture after adding the polvinylidene fluoride and before effecting the homogenisation.

The amount of thickener, and the properties of the dispersions obtained, are set out in Table Five.

TABLE Five

| Example | Thickener | | Stab (k) (p) | Sep (l) (q) | Visc (mPa·s) (r) |
|---|---|---|---|---|---|
| | Type (n) | Amount (o) | | | |
| 11 | NIL | NIL | C    | 25 | 95   |
| 12 | T1  | 0.5 | NC   | 0  | 3120 |
| 13 | T2  | 0.5 | NC   | 10 | 2500 |
| 14 | T3  | 0.5 | NC   | 0  | 3440 |
| 15 | T4  | 1.0 | NC/F | 0  | 2800 |

Notes to Table Five
(k) and (l) are both as defined in Notes to Table Four.
(n) T1 is a polysaccharide available from Shell NV of Belgium as Shellflo S.
T2 is a 10% w/w aqueous solution of hydroxyethylcellulose available from Hercules, Belgium as Natrosol.
T3 is a polysaccharide available from Shell NV of Belgium as Shellflo X-N.
T4 is a 50% w/w aqueous solution of poly(oxyethylene) glycol of molecular weight about 20000.
(p) Stab was determined after standing for one week at ambient temperature.
NC/F indicates no caking but some flocculation was observed.
(q) Sep was determined after standing for one week at ambient temperature. The number is the % separation as given by the relationship
Sep (%) = Depth of clear liquid/Total depth × 100
(r) The viscosity of the product of Example 11 was measured as described in Note (m) to Table Four. The viscosity of the products of Examples 12 to 15 was measured as described in Note (b) to Table One.

I claim:
1. A composition comprising:
   (A) a glycoside of the formula

$R(OG)_a$ wherein:

R is a hydrophobic moiety;

G is a saccharide group; and a has a value of 1.3 to not more than 2; and (B) an acrylic copolymer selected from the group consisting of (i) acrylic copolymers containing water soluble side chains having 10–40 oxyethylene groups and not more than 5% by weight of units containing acid groups; and (ii) acrylic copolymers containing no water soluble side chains and comprising from 2 to 10% by weight of units derived from acid monomers; wherein the weight ratio of (A) to (B) is from 5:1 to 1:5, said composition being suitable to form a suspension of a particulate solid in an aqueous medium.

2. The composition of claim 1 (wherein the glycoside is an alkyl glucoside of the general formula:

$C_nH_{(2n+1)}O(C_6H_{10}O_5)_bH$ where:

n has a value of 8 to 14, and b has a value of from 1.3 to not more than two.

3. The composition of claim 1 wherein the water soluble side chains are polyoxyethylene chains terminated with an alkoxy group.

4. The composition of claim 1 wherein the acrylic copolymer is a copolymer an acrylic ester and an acrylic acid which has been reacted with polyethylene glycol or polyethylene glycol terminated with an alkoxy, group.

5. The composition of claim 1 wherein the acrylic copolymer contains at least 50% by weight of units containing water soluble side chains.

6. The composition of claim 1 wherein the acrylic copolymer is a polymer containing the units

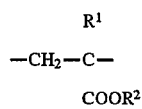

where
R¹ is hydrogen or a hydrocarbyl group;
R² is hydrogen, a hydrocarbyl group or a group $(AO)_xR^3$
R³ is hydrogen or a hydrocarbyl group;
A is an ethylene group;
x is team 10 to 40; and
at least some of the groups R² are hydrogen or $(AO)_xR^3$.

7. The composition of claim 6 wherein the acrylic copolymer consists of the units

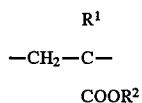

wherein the groups R¹ and/or R² are different in different units.

8. The composition of claim 7 wherein R¹ is hydrogen or methyl and may be different in different units and R² is a combination of at least two of hydrogen, hydrocarbyl and hydrocarbyloxy polyoxyethylene.

9. The composition of claim 1 in which the weight ratio of A to B is 1:1.

10. The composition of claim 1 in which the number average molecular weight of the acrylic copolymer ranges from 1,000 to 10,000.

11. The composition of claim 10 in which the number average molecular weight of the acrylic copolymer ranges from 2,000 to 6,000.

12. The composition of claim 1 in which the glycoside is selected from the group consisting of a polyglycoside, a mixture or polyglycosides, a mixture of a monoglycoside and a polyglycoside and a mixture of a monoglycoside with a mixture of polyglycosides.

13. The composition of claim 1 in which G is a saccharide selected from the group consisting of fructose, glucose, mannose, galaclose, telose, gulose, allose, allrose, idosc, arabinose, xylose, lyxose, ribose and mixtures thereof.

14. The composition of claim 13 in which the saccharide is glucose.

15. The composition of claim 2 in which n is from 8 to 11 and b is about 1.35.

16. The composition of claim 15 in which n has an average value of 10.

17. The composition of claim 3 in which the alkoxy group is methoxy.

18. The composition of claim 8 which R¹ is methyl and R² is a combination of hydrogen, methyl, butyl and methoxy-polyoxyethylene.

19. A composition comprising:

(A) a glycoside of the formula

wherein:
R is a hydrophobic moiety;
G is a saccharide group; and
a has a value of 1.3 to not more than 2; and
(B) an acrylic copolymer selected from the group consisting of (i) acrylic copolymers containing water soluble side chains having 10–40 oxyethylene groups and not more than 5% by weight of units containing acid groups; and (ii) acrylic copolymers containing no water soluble side chains and comprising from 2 to 10% by weight of units derived from acid monomers; wherein the weight ratio of (A) to (B) is from 20:1 to 1:5, said composition being suitable to form a suspension of a particulate solid in an aqueous medium.

* * * * *